(12) United States Patent
Eliseev et al.

(10) Patent No.: US 10,047,306 B2
(45) Date of Patent: Aug. 14, 2018

(54) METHOD OF FRACTIONATING MIXTURES OF LOW MOLECULAR WEIGHT HYDROCARBONS

(71) Applicant: Rosneft Oil Company, Moscow (RU)

(72) Inventors: Andrey Anatolievich Eliseev, Moscow (RU); Dmitriy Igorevich Petukhov, Perm (RU); Artem Anatolievich Eliseev, Tula (RU); Viktor Andreevich Brotcman, Orenburgskaya obl. (RU); Alexey Viktorovich Lukashin, Moscow (RU)

(73) Assignee: Rosneft Oil Company, Moscow (RU)

(*) Notice: Subject to any disclaimer, the term of this patent is extended or adjusted under 35 U.S.C. 154(b) by 0 days.

(21) Appl. No.: 15/567,154

(22) PCT Filed: Apr. 26, 2016

(86) PCT No.: PCT/RU2016/000245
§ 371 (c)(1),
(2) Date: Oct. 17, 2017

(87) PCT Pub. No.: WO2016/175682
PCT Pub. Date: Nov. 3, 2016

(65) Prior Publication Data
US 2018/0100109 A1 Apr. 12, 2018

(30) Foreign Application Priority Data
Apr. 29, 2015 (RU) .............................. 2015116152

(51) Int. Cl.
*B01D 61/00* (2006.01)
*C10G 70/04* (2006.01)
(Continued)

(52) U.S. Cl.
CPC ......... *C10G 70/045* (2013.01); *B01D 53/228* (2013.01); *B01D 61/00* (2013.01);
(Continued)

(58) Field of Classification Search
None
See application file for complete search history.

(56) References Cited

U.S. PATENT DOCUMENTS

| 2,924,630 A | 2/1960 | Fleck et al. | |
| 2008/0134895 A1* | 6/2008 | Ruud | B01D 53/228 96/9 |
| 2017/0209829 A1* | 7/2017 | Hu | B01D 53/228 |

FOREIGN PATENT DOCUMENTS

| EP | 0428052 | 1/1998 |
| RU | 0481660 | 4/1992 |

(Continued)

*Primary Examiner* — Tam M Nguyen
(74) *Attorney, Agent, or Firm* — Carmody Torrance Sandak & Hennessey LLP (57) ABSTRACT

The invention relates to membrane gas separation, in particular to a method of fractionating mixtures of low molecular weight hydrocarbons based on the capillary condensation of the mixture components in the pores of microporous membranes having uniform porosity and a pore diameter of 5 to 250 nm, wherein, for capillary condensation, the temperature of the membrane and the pressure on the permeate side are kept below the temperature and the pressure of the feed mixture. The method provides significantly increasing membrane permeability with respect to condensable components, and also component separation factors, while also allowing to avoid deep cooling of the gas stream fed to a membrane module, and to carry out gas separation under insignificant cooling of the membrane on the permeate side (down to -50° C.). The invention provides for energy- (Continued)

efficient fractionation of hydrocarbon mixtures, including separation and drying of natural and associated petroleum gases.

8 Claims, 5 Drawing Sheets

(51) Int. Cl.
    *B01D 53/22*      (2006.01)
    *B01D 71/02*      (2006.01)

(52) U.S. Cl.
    CPC ........ *B01D 71/025* (2013.01); *B01D 2311/04* (2013.01); *B01D 2311/10* (2013.01); *B01D 2311/14* (2013.01); *B01D 2325/02* (2013.01); *B01D 2325/26* (2013.01)

(56) References Cited

FOREIGN PATENT DOCUMENTS

| | | |
|---|---|---|
| RU | 2344161 | 1/2009 |
| WO | 1994/001209 | 1/1994 |
| WO | 2011/104226 | 9/2011 |

\* cited by examiner

METHOD OF FRACTIONATING MIXTURES OF LOW MOLECULAR WEIGHT HYDROCARBONS

TECHNICAL FIELD

The invention relates to the field of membrane gas separation and can be used for energy efficient fractionation of hydrocarbon mixtures including separation and drying of natural and associated petroleum gases. The main purpose of the invention is to remove heavy C3-C6 hydrocarbons away from the natural and associated petroleum gases and also produce gas mixtures of constant composition. The invention relates to a method of fractionating hydrocarbons based on the selective capillary condensation of the gases in the pores of microporous membranes having a diameter of 5 to 250 nm. The improved characteristics of the separation process are achievable owing to cooling of the membrane and permeate and also using microporous membranes having uniform pore size distribution and a pore diameter of 5 to 250 nm. Realization of the method of capillary gas condensation in channels of such membranes allows for achieving unique parameters of butane permeability of more than 500 m$^3$/(m$^2$·atm·h) which is more than 20-fold greater than the permeability at realization of Knudsen diffusion mechanism; furthermore, the method also enables achieving $C_4H_{10}/CH_4$ separation factors of up to 63, determined by blockage of the channels in the membrane by liquid phase. Effective drying of natural and associated petroleum gases using a small surface area of the membrane and significant reducing energy costs in view of absence of necessity to cool the entire gas volume are provided thereby.

BACKGROUND OF THE INVENTION

A method of membrane separation of associated petroleum gas is known using capillary condensation approaches described in the patent EP2539043 and disclosing a method of separating natural gas on zeolite membranes by means of condensation of heavier hydrocarbons in microporous membrane layer, on different sides of which a pressure drop is provided. This method allows for separating a hydrocarbon mixture without cooling the membrane or feed gas. In accordance with this method the starting mixture is fed at a pressure of more than 5 bars whereas the permeate side pressure is 4 to 10 bar lower. This leads to condensation of heavier hydrocarbons in membrane pores whereas selectivity is determined by the size of these pores. For plants of such type mostly mesoporous zeolite membranes are used, namely those based on ZSM-5 ($Na_nAl_nSi_{96-n}O_{192} \cdot 16H_2O$, 0<n<27).

A significant disadvantage of the technique described above is low permeability of the membrane (less than 1 m$^3$/m$^2$·atm·h) which makes this method ineffective and uneconomical at treatment of industrial gases. Low permeability of these membranes is determined by small diameter of zeolite pores, which, on the one hand, allows for carrying out condensation of heavy hydrocarbons without cooling the membrane, while, on the other hand, significantly reduces membrane permeability. This solution has been selected as a closest prior art (prototype) for the claimed method of membrane separation of hydrocarbons.

A significant increase in membrane permeability while maintaining the gas transfer mode through the membrane according to capillary condensation and flow mechanism can be achieved by increasing the diameter of membrane pores at insignificant cooling thereof.

DISCLOSURE OF THE INVENTION

The present invention is directed to solving the problem of providing a method of separating the low molecular weight hydrocarbons, in particular natural and associated petroleum gases. The proposed method of fractionating is based on the selective capillary condensation of the gases in the pores of microporous membranes with a diameter of 5 to 250 nm at insignificant cooling (down to −50° C.) of the membrane. Separation of mixture components is achieved owing to different condensation pressures of light and heavy vapor fractions, and also due to limited solubility of light fractions in condensed hydrocarbons. This approach allows for avoiding energy costs on deep cooling of the full volume of the gas and for realizing the separation process at cooling of only the space after the membrane.

The technical result for the invention resides in increasing efficiency and selectivity of the process of fractionating low molecular weight hydrocarbons owing to selective capillary condensation of gases in micropores of the membranes at insignificant cooling of the membrane.

The said technical result for the method of fractionating low molecular weight hydrocarbons of associated petroleum gases is achieved by that the membrane and permeate temperature and also the pressure on the permeate side are maintained below the temperature and pressure of the feed crude mixture, and the membrane has a uniform porosity with a pore diameter in a range of 5 to 250 nm. The temperature and pressure at the permeate side are expedient to be selected in such a way so the equilibrium pressure of the saturated vapors of the removed components on the permeate side would be lower than the partial pressure of the components in the feed stream. Thereby, capillary gas condensation would be observed in the micropores of the membrane, which would provide for increased permeability and selectivity of the membrane. A required condition of capillary gas condensation in all membrane pores and, as a consequence, achievement of high gas separation degrees is narrow pore size distribution. Wherein, pore diameter and pore tortuosity would determine the value of membrane permeability.

Collection and removing of permeate are preferably to be carried out in liquid state.

It should be noted that liquefaction of hydrocarbons from the permeate side would occur more effectively for heavy components whereas the equilibrium partial pressure of light components (C1 and C2) would be almost unchanged at cooling to the temperatures in the range of −50 to 0° C. Therefore, the liquid phase would be enriched by heavy hydrocarbons and the equilibrium gas phase would be enriched by light hydrocarbons. In turn, in baromembrane process this equilibrium would provide a pressure drop on the membrane, the partial pressures of light components ($C_1$-$C_2$) under quasi-stationary (quasi-steady-state) conditions (at established streams) would differ insignificantly, whereas difference in partial pressures of heavy components ($C_{3+}$) would be quite significant and would be able to ensure a transport of heavy hydrocarbons through the membrane. Therefore, permeate would be enriched by heavy hydrocarbons and retentate would be enriched by light hydrocarbons.

The process of hydrocarbon separation by capillary condensation method implies cooling of the membrane and transport of components liquefied in the pores, which makes it possible to collect the permeate ($C_{3+}$) in the liquid state and significantly simplifies further manipulations at transportation. Thereby, the pressure from permeate side is determined by permeate temperature and contents of the liquid mixture, and, depending on the temperature value and gas contents used, it can be 1 to 5 bars below the retentate pressure.

Therefore, membrane separation of gas mixture using capillary condensation on microporous membranes can be realized using a membrane separation unit with a refrigeration cycle. It is possible to use any means and methods known from the art for cooling the membrane. Thereby, it is possible to use retentate for pre-cooling of the feed stream which is fed to the membrane unit input. At the same time the proposed method of fractionating mixtures of low molecular weight hydrocarbons using capillary condensation on microporous membranes does not imply the pre-cooling of the crude mixture feed to the membrane and can be realized without this step.

Moreover, the absence of necessity of direct cooling of the feed stream to the membrane temperature and use of the refrigeration cycle only for cooling and condensation of permeate allows for significantly increasing energy efficiency of separation of hydrocarbon mixtures compared to conventionally used low temperature separation methods.

Release of heat used for cooling can be realized to retentate and/or to the environment on air evaporator.

For effectively separating mixtures using capillary condensation at high performance of membranes the through porosity of the membrane is required with controlled pore diameter in the range of 5 to 250 nm and also small size dispersion of the pores (less than 25%). In case of a wide pore size distribution in accordance with the Kelvin equation, blockage of pores by the liquid phase would be observed only in the pores of small diameter, whereas transport of all mixture components would be carried out through the pores of larger diameter. This effect would significantly decrease the efficiency of gas separation.

Microporous membranes having the required microstructure with the pore diameter (5 to 250 nm) and narrow pore size distribution (dispersion of less than 25%) are represented by two main classes of materials: anodic aluminum oxide membranes and track membranes.

The anodic aluminum oxide membranes are formed by aluminum anodic oxidation methods at high voltages. The unique porous structure of anodic aluminum oxide (direct pores with controlled diameter) in combination with high thermal and mechanical stability makes this material practically an ideal subject for the formation of gas membranes operating according to the capillary condensation principle. In order to obtain the membranes anodic oxidation of aluminum plate is carried out at the voltages of 10 to 250 V in the dissolving electrolytes (0.3M $H_2SO_4$, 0.3M $H_2C_2O_4$, 0.1M $H_3PO_4$) resulting in formation of an oxide film, thickness of which is determined by charge density passed during the anodizing, while the pore diameter is determined by anodic oxidation voltage. Thereby, alteration of voltage during the anodic oxidation process allows for controllably changing the pore diameter in order to form asymmetric membranes. Wherein, all pores of the same depth from the surface have the same diameter, thus resulting in formation of hierarchic porous structure. Then removal of the barrier metal layer is carried out by chemical etching in the acid solution. Therefore, this method allows for obtaining a permeable membrane with through porosity with the required pore structure within the pore diameter range of 5 to 250 nm.

The second widely used membrane type having the required characteristics of the porous structure are track-etched polymeric membranes based on polyethylene terephthalate or polycarbonate. These membranes also have narrow pore size distribution due to the uniform track etching rate, and, therefore, they can be used for fractionating mixtures of low molecular weight hydrocarbons using capillary condensation in the described method.

The above features are essential features of the invention, and when being realized in combination, they are sufficient for achievement of the required technical effects.

The said method allows for significantly increasing the membrane permeability with respect to condensed components (over 500 $m^3/(m^2 \cdot atm \cdot h)$ with respect to n-butane) and selectivity of component separation (the $n-C_4H_{10}/CH_4$ separation coefficient is greater than 60 for a mixture having an associated petroleum gas composition) while also making it possible to dispense with deep cooling of the gas stream fed to a membrane module, and to carry out gas separation under insignificant cooling of the membrane on the permeate side (up to −50° C.). By means of using this method effective drying of natural and associated petroleum gases is possible while using small membrane surface area. The present invention is industrially applicable and can be realized under industrial conditions.

Figure 1:
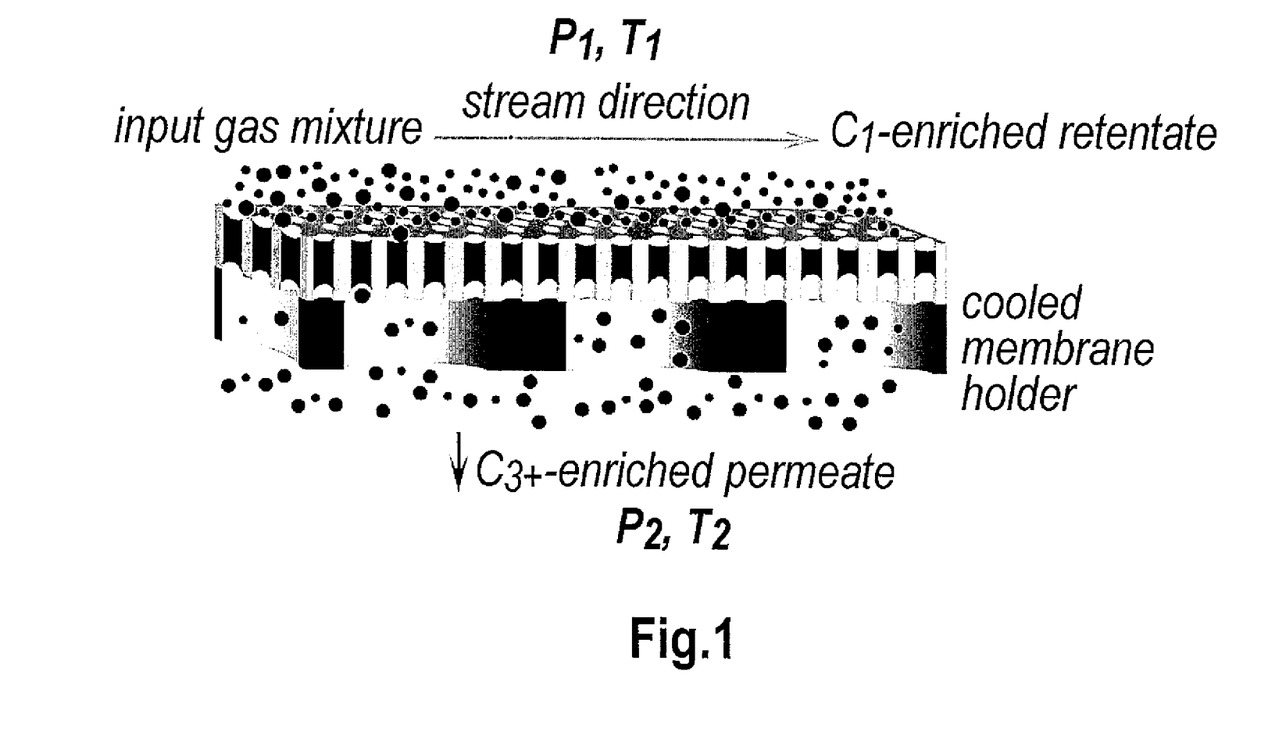
FIG. 1 outlines a common scheme of fractionating mixtures of hydrocarbons using capillary condensation in the pores of microporous membranes.

The separation principle of lower hydrocarbons of associated petroleum gas using capillary condensation in the pores of microporous membranes is illustrated on FIG. 1.

BRIEF DESCRIPTION OF THE DRAWINGS

The essence of the invention is explained by the drawings wherein.

IMPLEMENTATION OF THE INVENTION

The present invention is explained by specific embodiment examples, which, however, are not the only ones possible and do not limit the scope of the invention.

Examples 1 to 5. Separation of Test Hydrocarbon Mixture on Microporous Inorganic Membranes Made from Anodic Aluminum Oxide For illustrating the method of fractionating low molecular weight hydrocarbons using the approach of capillary condensation on microporous inorganic membranes anodic aluminum oxide membranes were formed 100 microns thick and with pore diameter of 5 to 250 nm.

In view of low permeability of the membranes with small diameter pores and significant thickness (required for providing a sufficient mechanical strength) a membrane with 6 nm pore diameter (Example 1) was formed as a layered asymmetric membrane having a selective layer (with layer thicknesses: 90 microns at $D_{pore}$=120 nm; 7 microns at $D_{pore}$=40 nm; 3 microns at $D_{pore}$=6 nm). The membrane was formed by anodic oxidation in 0.3M oxalic acid solution by stepwise reduction of voltage. The layer with 120 nm pore diameter was formed at 120V voltage, the layer with 40 nm diameter—at 40V, the layer with 6 nm diameter—at the voltage of up to 10 V.

Anodic aluminum oxide membranes with 43 and 130 nm pore diameter (Examples 2, 3 and 4) were made by anodic oxidation in 0.3 M oxalic acid solution at the voltages of 40 V and 120V correspondingly. Membrane thickness control was carried out according to charge density for the charge passed during anodization, assuming oxidation efficiency of 0.451 ($\mu$m/cm$^2$)/C for the 40 V voltage to 0.55 ($\mu$m/cm$^2$)/C for the 120 V voltage.

The anodic aluminum oxide membrane with 230 nm pore diameter (Example 5) was made by anodic oxidation in 0.3 M phosphoric acid solution at 190 V voltage. Membrane thickness control was carried out according to charge density for the charge passed during anodization, assuming oxidation efficiency of 0.45 ($\mu$m/cm$^2$)/C.

Figure 2A:
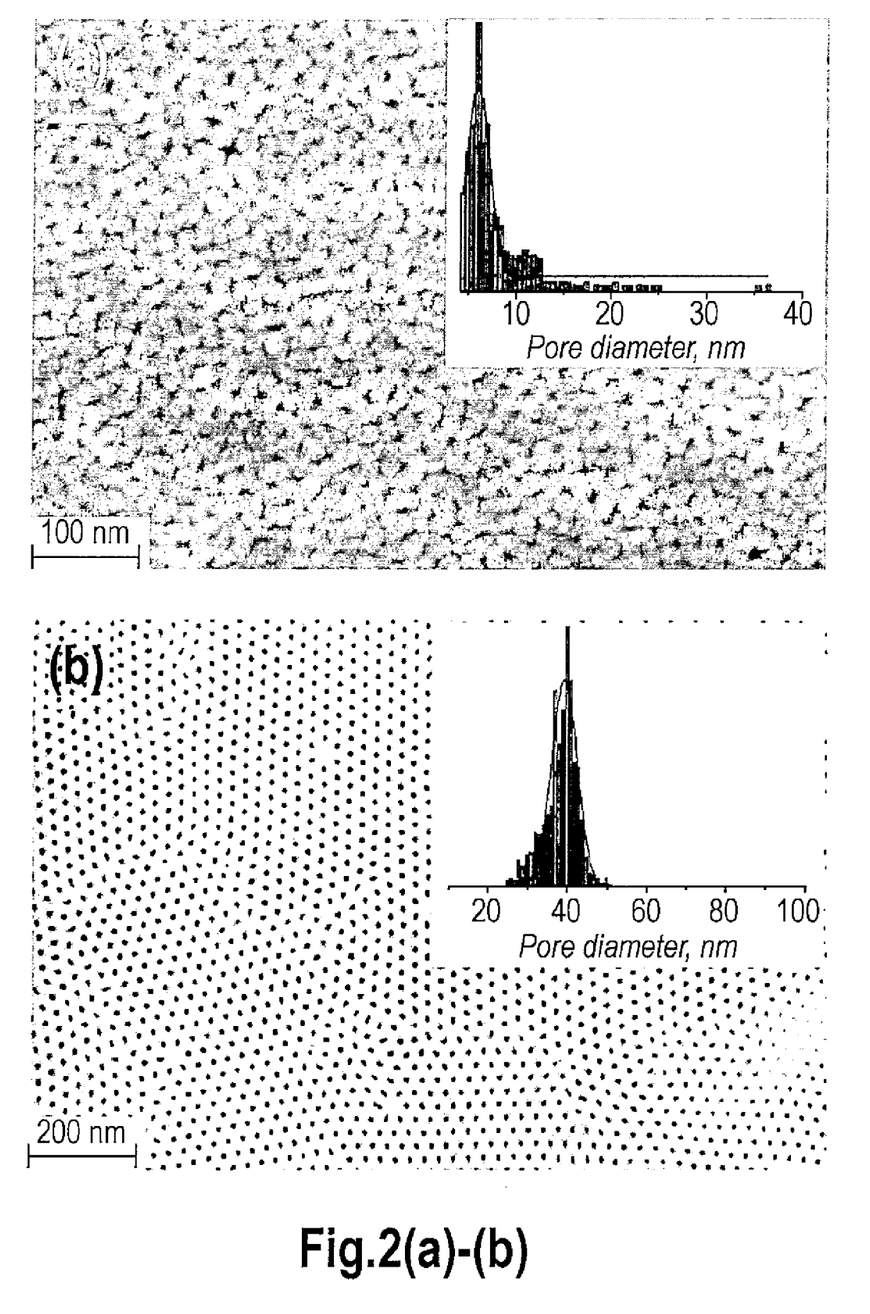
FIG. 2 demonstrates micrographs of the surfaces and pore size distribution in the membranes: (a) —microporous asymmetric inorganic membrane made from anodic aluminum oxide with selective layer pore diameter of 6 nm (embodiment example 1); (b) microporous inorganic membrane made from anodic aluminum oxide with pore diameter of 43 nm (embodiment examples 2 and 3); (c) microporous inorganic membrane made from anodic aluminum oxide with pore diameter of 130 nm (embodiment example 4); (d) microporous inorganic membrane made from anodic aluminum oxide with pore diameter of 230 nm (embodiment example 5); (e) Whatman Nuclepore track polycarbonate membrane with pore diameter of 110 nm (embodiment example 6)
Figure 2C:
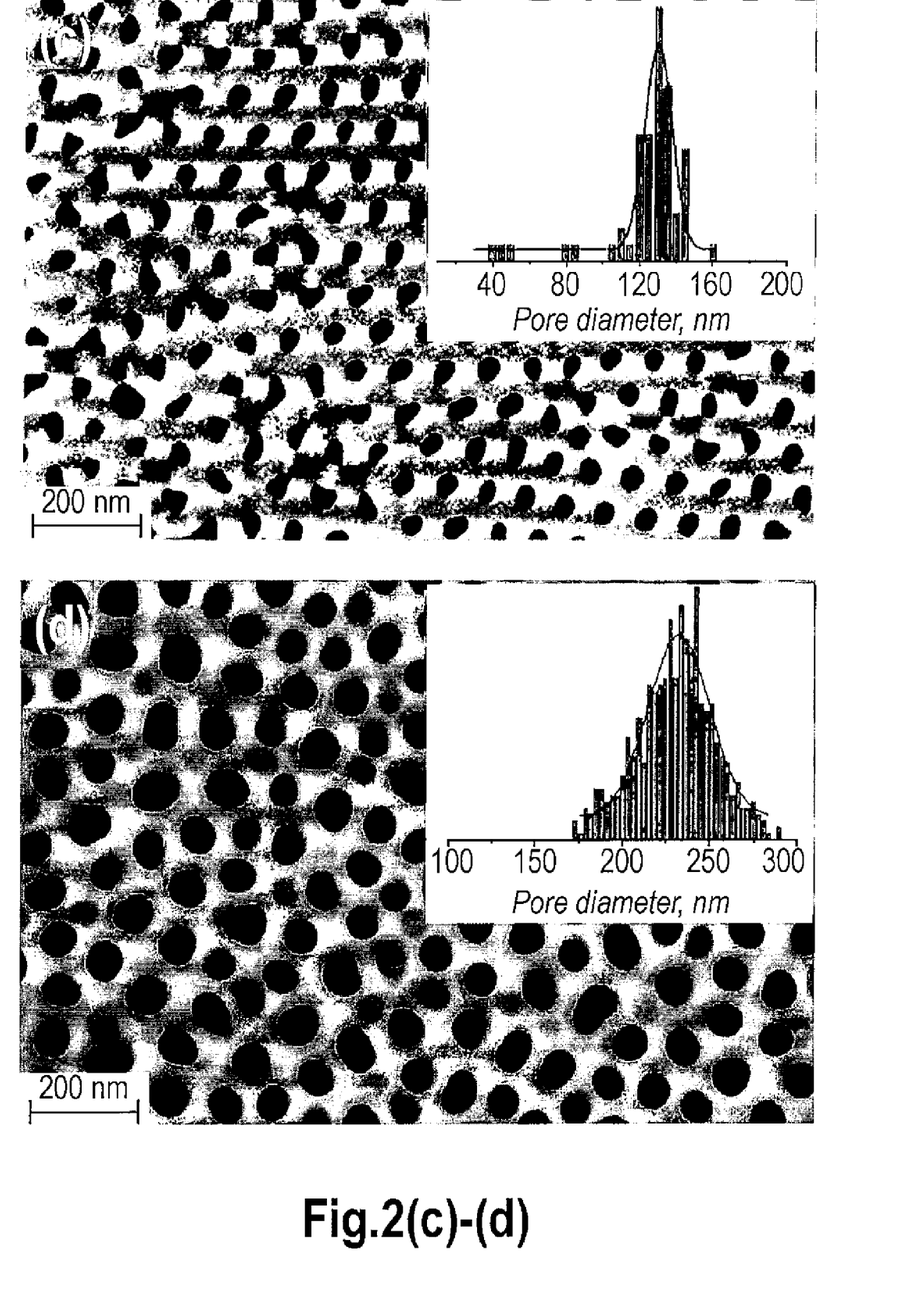
Figure 2E:
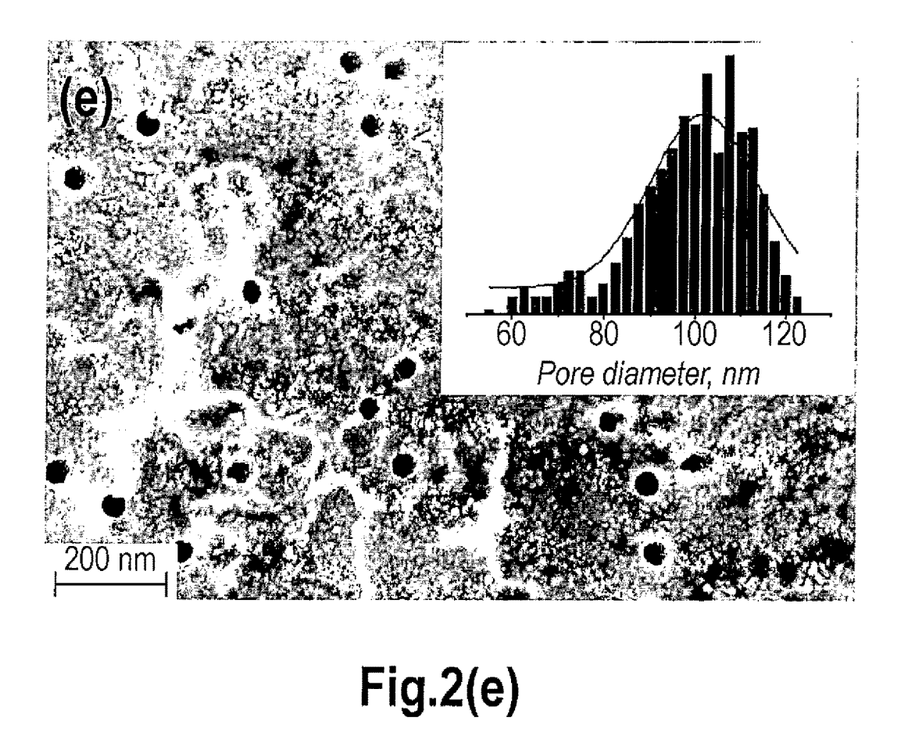

Removal of the metal barrier layer for all membranes was carried out by chemical etching in the acid solution with electrochemical detection of the pore opening moment. This approach provides reproducibility of barrier layer removal. Microphotographs of the membrane surface and pore size distribution are shown in FIG. 2. Data on membrane pore diameters and pore size distribution are also outlined in Table 1.

Fractionation of low molecular weight hydrocarbons using capillary condensation on microporous inorganic anodic aluminum oxide membranes was carried out in a membrane module equipped with a cooled membrane holder. Also, thermostatic control of permeate section at lowered temperature was carried out.

Figure 3:
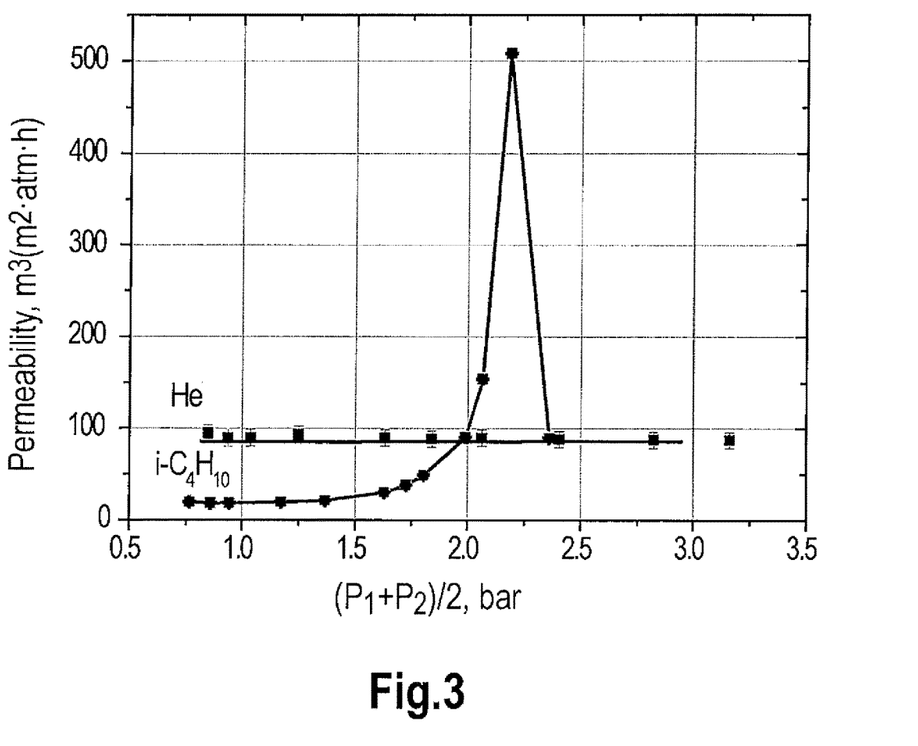
FIG. 3 demonstrates a plot of permeability in the asymmetric microporous inorganic membrane made from anodic aluminum oxide vs. average pressure on the membrane for He and $i-C_4H_{10}$ at the membrane holder temperature of 10° C. and temperature of the fed gas of 25° C.

In order to determine the membrane permeability with respect to condensed gas, measurement of permeability of asymmetric microporous inorganic membrane using pure butane was carried out (FIG. 3). The obtained dependencies (plots) reflect a significant increase in membrane permeability of more than 500 m$^3$/(m$^2$·atm·h) upon approaching the condensation pressure in membrane pores. Therefore, capillary condensation of gases in membrane channels leads to significant increase in membrane permeability, which allows for significantly increasing membrane efficiency at industrial application.

In order to test the method using gas mixtures a test mixture was made simulating contents of the associated petroleum gas, of the following contents: 67.0 vol. % $CH_4$, 7.1 vol. % $C_2H_6$, 10.1 vol. % $C_3H_8$, 2.6 vol. % $i-C_4H_{10}$, 5.2 vol. % $n-C_4H_{10}$, 1.4 vol. % $i-C_5H_{12}$, 1.4 vol. % $n-C_5H_{12}$, 3.9 vol. % $C_6H_{14}$, 1.6 vol. % $N_2$. The contents of the feed gas mixture and retentate gas mixture were determined by means of gas chromatography using the Perkin Elmer Clarus 600 gas chromatograph.

Experiments with membranes having various pore diameters were carried out. During the experiments the membrane module was fed with gas mixture under the pressure $P_1$ (6-7 bar) and the temperature $T_1$=50° C. High temperature of the feeding gas mixture was used in order to avoid gas condensation prior to feeding it to the membrane module. The membrane and the permeate section were cooled to the required temperature. The permeate side pressure, $P_2$ was maintained equal to the equilibrium pressure come to stay at cooling the gas mixture (introduced to the permeate section at $P_1$ and $T_1$=25° C.) or 1 to 3 bar lower than the equilibrium pressure. The input gas stream was controlled in such a way so to minimize release of C1 and C2 components to permeate at maximum stream. Full parameters of experiments are outlined in Table 1. Table 1 also outlines contents of retentates after membrane fractionating of the mixture. Averaged contents and separation coefficients with respect to components were calculated from feed mixture and retentate streams and compositions.

According to experiments performed the capillary condensation of gases in membrane channels with pore diameter in the range of 5 to 250 nm leads to significant increase in efficiency of the membrane and to efficient separation of heavy hydrocarbons. The maximum separation coefficients achieved for the outlined conditions were $\alpha(C_3H_8/CH_4)$= 39.7; $\alpha(i-C_4H_{10}/CH_4)$=61.6; $\alpha(n-C_4H_{10}/CH_4)$=63.5; $\alpha(i-C_5H_{12}/CH_4)$=69.5; $\alpha(i-C_5H_{12}/CH_4)$=70.6; $\alpha(i-C_5H_{12}/CH_4)$= 71.4 for the membrane with 43 nm pore diameter and membrane holder and permeate section temperature of −46.5° C. The minimum stage cut of light component (C1 and C2) was less than 2.5%, at feed stream of more than 340 m$^3$/(m$^2$·atm·h) and the permeate stream of up to 79.2 m$^3$/(m$^2$·atm·h), thus providing for possible practical applicability of the method. The measured retentate dew point with respect to hydrocarbons at experimental pressure was less than −38° C., the calculated value was −45.9° C. The calculated values of the dew points with respect to hydrocarbons for examples 1 to 5 are also outlined in Table 1.

The results obtained for other membranes and process conditions, though inferior to the results outlined in Example 3, also illustrate high separation efficiency for the components of the mixture. Thereby, increasing in the membrane pore diameter results in increasing in the maximum permeate stream through the membrane and also to increasing stage cut of light components. It should also be noted that retentate composition changes insignificantly when experimental conditions are changed (see Examples 1 to 4), thereby making it possible to use this method for producing mixtures of constant composition. Moreover, sequential separation of fractions with various boiling points and equilibrium partial volumes by sequential use of membranes cooled to various temperatures is possible (Examples 2, 3).

Example 6. Separation of a Test Hydrocarbon Mixture Using a Track Polyethylene Terephthalate Track Membrane A commercially available sample of Whatman Nuclepore polycarbonate membrane with pore diameter of 100 nm was used as membrane material in this example. Microphotograph of the membrane surface is shown in FIG. 2. The pore diameter determined according to scanning electron microscopy was 110±27 nm (Table 1). The experiment on fractionating the low molecular weight hydrocarbons using capillary condensation on track membrane was carried out similarly to the experiments described in Examples 1 to 5. The experimental parameters are outlined in Table 1.

The maximum separation coefficients achieved for the outlined conditions were: $\alpha(C_3H_8/CH_4)$=3.5; $\alpha(i-C_4H_{13}/CH_4)$=4.4; $\alpha(n-C_4H_{10}/CH_4)$=4.1; $\alpha(i-C_5H_{12}/CH_4)$=5.6; $\alpha(i-$ $C_5H_{12}/CH_4)=6.8$; $\alpha(i-C_5H_{12}/CH_4)=7.8$. The light component (C1 and C2) stage cut was ~14% at the feed stream of 230 m³/(m²·atm·h). A relatively high light component stage cut in this case is associated with non-uniformity of the pores, as well as due to the presence of pores with a size twice as large in the membranes, resulted from combining of tracks. Despite the high light component stage cut, high permeability of the membrane in the capillary condensation mode in combination with commercial availability determines its practical applicability in the method.

Therefore, according to the obtained data the claimed method allows for efficiently separating hydrocarbon mixture including natural and associated petroleum gases using capillary condensation on microporous membranes.

TABLE 1

Process parameters for the fractionating of low molecular weight hydrocarbons using capillary condensation on microporous membranes for a mixture of test contents (67.0 vol. % $CH_4$, 7.1 vol. % $C_2H_6$, 10.1 vol. % $C_3H_8$, 2.6 vol. % $i-C_4H_{10}$, 5.2 vol. % $n-C_4H_{10}$, 1.4 vol. % $i-C_5H_{12}$, 1.4 vol. % $n-C_5H_{12}$, 3.9 vol. % $C_6H_{14}$, 1.6 vol. % $N_2$) for various membrane types

| | Example No. | | | | | |
|---|---|---|---|---|---|---|
| | 1 | 2 | 3 | 4 | 5 | 6 |
| Membrane parameters | | | | | | |
| Membrane type | Anodic aluminum oxide | | | | | Track polycarbonate |
| Average pore diameter, nm | 6 | 43 | 43 | 130 | 230 | 110 |
| Pore size distribution, nm, (%) | 1.5 (25) | 6 (14) | 6 (14) | 20 (15) | 40 (17) | 27 (25) |
| Porosity, % | 14 | 12 | 12 | 8 | 8 | 3.8 |
| Process parameters | | | | | | |
| Feed mixture temperature, $T_1$, °C | 50 | 50 | 50 | 50 | 50 | 50 |
| Membrane holder and permeate temperature, $T_2$, °C | −46.5 | −20 | −46.5 | −46.5 | −46.5 | −46.5 |
| Feed stream, Nm³/(m²·h) | 150.2 | 322.4 | 343.3 | 336.5 | 275.2 | 237.1 |
| Retentate stream, Nm³/(m²·h) | 114.6 | 248.4 | 267.5 | 252.2 | 229.3 | 174.0 |
| Feed stream/retentate pressure, $P_1$, bar | 6.6 | 6.6 | 6.1 | 6.3 | 6.3 | 6.3 |
| Permeate side pressure, $P_2$, bar | 3.0 | 5.3 | 4.7 | 4.7 | 5.1 | 4.6 |
| Membrane pressure drop, bar | 3.6 | 1.3 | 1.4 | 1.6 | 1.2 | 1.7 |
| Permeate gas phase stream, Nm³/(m²·h) | 0.3 | 3.3 | 0.5 | 1.3 | 5.6 | 11.2 |
| Permeate liquid phase stream, l/(m²·h) | 151.1 | 310.0 | 307.6 | 342.3 | 146.0 | 228.8 |
| Calculated liquid permeate phase stream, Nm³/(m²·h) | 34.4 | 70.6 | 70.1 | 77.9 | 40.2 | 52.1 |
| Component contents in the retentate, % | | | | | | |
| $CH_4$ | 84.87 | 82.24 | 85.06 | 85.69 | 75.56 | 79.9 |
| $C_2H_6$ | 8.52 | 6.74 | 7.91 | 7.03 | 7.16 | 6.86 |
| $C_3H_8$ | 5.5 | 6.67 | 5.75 | 5.89 | 10.5 | 7.55 |
| $i-C_4H_{10}$ | 0.45 | 1.33 | 0.46 | 0.52 | 2.36 | 1.53 |
| $n-C_4H_{10}$ | 0.63 | 2.74 | 0.74 | 0.84 | 3.78 | 3.36 |

TABLE 1-continued

Process parameters for the fractionating of low molecular weight hydrocarbons using capillary condensation on microporous membranes for a mixture of test contents (67.0 vol. % $CH_4$, 7.1 vol. % $C_2H_6$, 10.1 vol. % $C_3H_8$, 2.6 vol. % i-$C_4H_{10}$, 5.2 vol. % n-$C_4H_{10}$, 1.4 vol. % i-$C_5H_{12}$, 1.4 vol. % n-$C_5H_{12}$, 3.9 vol. % $C_6H_{14}$, 1.6 vol. % $N_2$) for various membrane types

| | Example No. | | | | | |
|---|---|---|---|---|---|---|
| | 1 | 2 | 3 | 4 | 5 | 6 |
| i-$C_5H_{12}$ | 0.021 | 0.215 | 0.048 | 0.02 | 0.248 | 0.551 |
| n-$C_5H_{12}$ | 0.011 | 0.064 | 0.021 | 0.019 | 0.393 | 0.254 |
| $C_6H_{14}$ | <0.001 | <0.001 | 0.004 | <0.001 | <0.001 | 0.001 |
| Dew point with respect to $C_nH_{2n+2}$ (calcul., McWilson) | −46.6 | −26 | −45.9 | −44.3 | −24.3 | −17.8 |
| Stage cut of components, % | | | | | | |
| $CH_4$ | 3.6 | 5.7 | 1.4 | 4.4 | 6.4 | 12.8 |
| $C_2H_6$ | 8.4 | 23.6 | 9.4 | 22.5 | 12.3 | 26.1 |
| $C_3H_8$ | 58.5 | 49.1 | 55.6 | 56.3 | 13.4 | 45.2 |
| i-$C_4H_{10}$ | 86.8 | 60.6 | 86.2 | 85.0 | 24.4 | 56.8 |
| n-$C_4H_{10}$ | 90.8 | 59.4 | 88.9 | 87.9 | 39.5 | 52.6 |
| i-$C_5H_{12}$ | 98.9 | 88.2 | 97.3 | 98.9 | 85.2 | 71.1 |
| n-$C_5H_{12}$ | 99.4 | 96.5 | 98.8 | 99.0 | 76.6 | 86.7 |
| $C_6H_{14}$ | >99.98 | >99.98 | 99.95 | >99.98 | >99.98 | 99.98 |
| C1 + C2 stage cut | 3.84 | 7.48 | 2.23 | 6.22 | 6.99 | 14.08 |
| C3+ stage cut | 79.49 | 65.48 | 77.77 | 77.79 | 41.46 | 60.49 |
| Total | 23.70 | 22.95 | 22.08 | 25.05 | 16.68 | 26.61 |
| Separation factor for $C_n/C_1$ | | | | | | |
| $C_2H_6/CH_4$ | 2.3 | 4.1 | 6.7 | 5.1 | 1.9 | 2.0 |
| $C_3H_8/CH_4$ | 16.3 | 8.6 | 39.7 | 12.8 | 2.1 | 3.5 |
| i-$C_4H_{10}/CH_4$ | 24.1 | 10.6 | 61.6 | 19.3 | 3.8 | 4.4 |
| n-$C_4H_{10}/CH_4$ | 25.2 | 10.4 | 63.5 | 20.0 | 6.2 | 4.1 |
| i-$C_5H_{12}/CH_4$ | 27.5 | 15.5 | 69.5 | 22.5 | 13.3 | 5.6 |
| n-$C_5H_{12}/CH_4$ | 27.6 | 16.9 | 70.6 | 22.5 | 12.0 | 6.8 |
| $C_6H_{14}/CH_4$ | 27.8 | 17.5 | 71.4 | 22.7 | 15.6 | 7.8 |

The invention claimed is:

1. A method of fractionating mixtures of low molecular weight hydrocarbons characterized in that the separation of a feed mixture into permeate and retentate is carried out using a microporous membrane having uniform porosity and a pore diameter ranging from 5 to 250 nm, wherein the temperature of the membrane on the permeate and also the pressure on the permeate side are kept below the temperature and the pressure of the feed mixture to provide capillary condensation of mixture components in the micropores of the membrane.

2. The method of claim 1 characterized in that the temperature of the membrane and the pressure on the permeate side are selected such that the equilibrium pressure of the saturated vapors of the separated components on the permeate side is lower than the partial pressure of the components in the feed stream.

3. The method of claim 1 characterized in that the temperature of the retentate is above the temperature of the membrane and the permeate.

4. The method of claim 1 characterized in that the liquid phase of hydrocarbons is withdrawn from the permeate.

5. The method of claim 1 characterized in that the pore size dispersion of the membrane material is not above 25%.

6. The method of claim 1 characterized in that microporous inorganic anodic aluminum oxide membranes are used as the membrane material.

7. The method of claim 6 characterized in that the structure of the anodic aluminum oxide membrane comprises splitting of larger diameter into several pores having smaller diameter, wherein all the pores have the same diameter at the same depth from the membrane surface.

8. The method of claim 1 characterized in that track membranes are used as the membrane material.

* * * * *